Jan. 6, 1948.  J. E. FORRY  2,434,152
HOLDING DEVICE
Filed Jan. 18, 1945
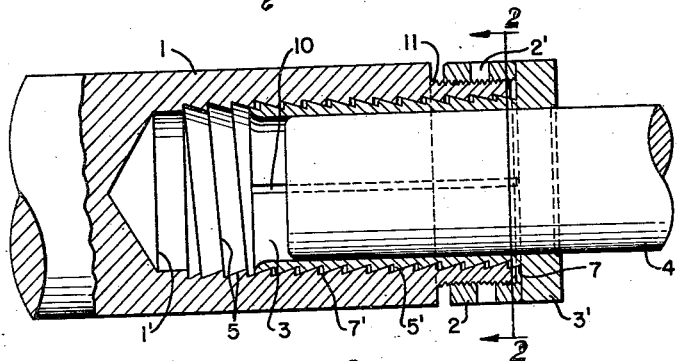
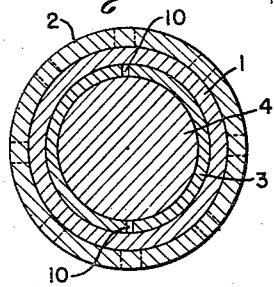
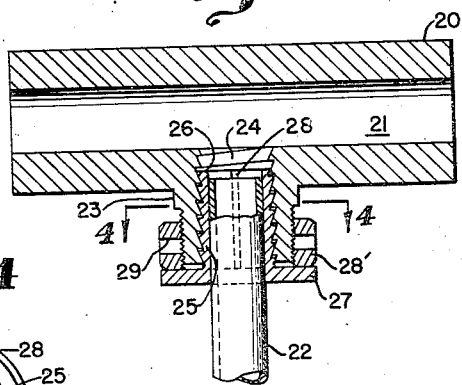
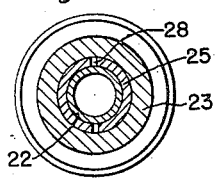
INVENTOR.
JAMES E. FORRY
ATTORNEY Patented Jan. 6, 1948

2,434,152

UNITED STATES PATENT OFFICE 2,434,152

HOLDING DEVICE

James E. Forry, Culver City, Calif., assignor to The Garrett Corporation, Airesearch Manufacturing Company division, Los Angeles, Calif., a corporation of California Application January 18, 1945, Serial No. 573,458

10 Claims. (Cl. 287—119)

This invention relates to devices for connecting together, linear or elongated articles, such as conduits and conductors; and has to do particularly with the problem of properly holding, or anchoring, the articles to be connected.

It is commonly found, in connecting linear or elongated articles together, that the usual connector is not uniformly effective throughout either its entire length or its cylindrical area, some parts thereof contacting the cable or tubing with a certain degree of tightness and other parts failing to contact the articles at all. Not only does this poor connection make for arcing and electrolysis between connected electric cables and for liquid losses between connected hydraulic tubings, but the joint provided thereby is insecure and structurally weak.

It is an object of the invention to provide a connector which will be adapted to connect elongated articles together with a uniform and full contact throughout the entire length of the connector, and with such firmness, force and rigidity that not only will the joint be secure and tight, but the arcing and electrolysis of the electric cables and the fluid losses from the hydraulic tubing, will be minimized.

It is a feature of this invention that the connector or holding device can be employed as well with elongated articles that are hollow as with solid ones; with flat, cross-sectioned articles as well as round-sectioned articles; and to connect them "end-to-middle" as well as "end-to-end," all in the novel advanced manner aforementioned.

Most tube-connectors and cable connectors, even though they do not make a satisfactory connection, are tedious and time-consuming to connect and disconnect, due to a multiplicity of rather complex parts which have to be manipulated.

It is another object of the present invention to provide a holding or connecting device which, although adapted to join and secure elongated articles in the above mentioned novel manner, will be quite easily and rapidly coupleable and de-coupleable.

In furtherance of the foregoing object, the invention aims to provide a holding device which will require the manipulation of but a single, simple part, either in coupling or in uncoupling, the conduits or conductors.

It is also an object of the invention to provide a holding device which will occupy very little space and in fact have substantially all of its members arranged within the volume defined by the external periphery of one of the two elongated articles to be connected. By virtue of this feature, the connection can be made in locations, such as in the confined framework of an airplane, where no other satisfactory connection could be manipulated.

In furtherance of this object, it is an aim of this invention to provide a clamp or connector in which the main member, or the article to which the other article is to be connected, will have internal means, such as buttress threads, against which complementary threads on a split sleeve, inside the main member, will be adapted to be forced to react, in such manner as to contract the sleeve around the article to be connected, by means of an actuating member lying substantially completely within the diameter or peripheral confines of the main member. All the members of the clamp or connector are thus arranged concentrically in a small compass substantially defined by the outside diameter of the operating parts of the main member.

The other objects, advantages and advancements of the invention will be made manifest, or become apparent, as this disclosure progresses.

The presently-preferred embodiments of the foregoing, and other, inventive concepts are illustrated in the accompanying drawings and described hereinafter, by way of example only, the invention being limited in its embodiments only by the scope of the accompanying claims.

In these drawings,

Fig. 1 is a sectional elevation of the holding device utilized for securing a conduit or conductor in an elongated member having a socket therefor;

Fig. 2 is a cross-section on line 2—2 of Fig. 1,

Fig. 3 is a sectional elevation of the holding device in employment for connecting two elongated articles end-to-middle instead of end-to-end as in Fig. 1, and Fig. 4 is a cross-section on line 4—4 of Fig. 3.

Referring more in detail to the embodiments shown in the drawings, and first alluding to Fig. 1, the construction includes a main elongated member 1. This member may be either a dead-ended anchorage bar, provided with an open socket 1' at one end for securing the opposite end of a thimbled cable, bus bar, or the like 4; or may be tubular and hollow throughout its length for receiving and holding the opposite end of another hollow tube, in place of the thimbled cable 4.

In either case, at least a portion of the length of the wall of the bore 1', or the like, is peripherally provided with a spiral inclined plane, or helically wound wedge 5. Screwed into the bore 1' is a sleeve or thimble member 3, having a complementary spiral inclined plane 5' extending around its periphery substantially the full length of the member 3. The outer end of the sleeve is annularly flanged, as shown at 3'. The body-portion of the sleeve is provided with longitudinally extending slots 10, here shown as two in number and lying diametrically opposite each other.

The outer end of the main or body member 1 is reduced in diameter, as at 11, and provided thereat with suitable conventional threads. Mounted on these threads is a nut 2, adapted to be both forwardly advanced, and retracted, on the other threads. This nut is provided with socket-holes 2' for manipulation by a spanner wrench, or the like.

The clamping of the member 4 inside the member 1 is initiated and maintained by the nut 2. This nut is adapted to be advanced on its threads towards the adjacent face of the flange 3', and upon contacting same, is then set up still tighter against the flange. The axial thrust is transmitted to the interengaging inclined-plane faces of the buttress threads on the sleeve and on the main member, respectively. The faces 7 of the thread 5' are thereby forced to slide inwardly on the complementary faces 7' of the other spiral-wedge threads 5. The axial force is thus transformed into a multitude of inwardly directed, radial forces acting all around the periphery of the thin sleeve member 3, serving to radially and circumferentially contract this sleeve around the entire periphery of the full length of the member 4 that lies within the sleeve. The clamp is thus effective throughout its entire engaged-length and area, establishing a substantially perfect electrical contact, if the member 4 is an electric conductor. It also provides complete and full bearing-surfaces for the joint, thereby producing a strong, secure connection of the two elongated articles. Despite the novel nature of the connection, it obviously can be quickly and easily coupled, involving the manipulation of but one movable part—the nut 2. The connector has all its operating parts disposed coaxially with the main body or socket-member 1, and no part lies substantially outside the outer circumference thereof. The latter feature is of especial utility where not much peripheral or lateral space is available for employing an end-to-end type of connector, as is the case in certain locations in the framework of an airplane.

The embodiment illustrated in Fig. 3 includes constructional features for connecting two or more members end-to-middle, instead of end-to-end. The construction shown comprises a conduit, block, or tube 20, having a central passageway 21, to which another conduit or tube 22 is to be connected and anchored. To this end, the main conduit 20 is provided with a hollow protuberance or neck 23, intermediate its ends, as shown. The internal periphery of the neck and that of the adjacent portion of the block is provided with a spiral wedge, or buttress thread 24, for engaging a complementary buttress thread 25 on an inserted sleeve 26. The sleeve 26 is relatively thin-walled and its outer end bears an annular flange 27. The sleeve also is provided with at least two, diametrically opposed, longitudinal slots 28, extending from a point immediately inward of the flange, to the opposite end of the sleeve.

The outer periphery of the member 23 is provided with conventional screw-threads. Meshed therewith is an annular nut 28', having apertures 29 adapted for engagement by a spanner wrench for advancing the nut 28' against the flange 27.

After the nut is advanced against the flange, further advancement results in axial thrust which in turn results in engagement of the inclined faces of the buttress threads of the sleeve 26 and member 23, and effects a clamping action similar to that described in connection with Figs. 1 and 2.

Thereby the conduit or conductor 22 is firmly seized, contacted and connected. Moreover, the main member 20 is thus rendered a holding device and can, if desired, be constituted as a solid block of material, except for the hollow neck, to serve as a "dead-ended" holding, or anchoring device.

The inventive concepts contemplate many other applications of the foregoing inventive principle to constitute holding devices for various elongate bodies in various situations, the invention being limited in its embodiments, only by the scope of the sub-joined claims.

What I claim is:

1. In combination: anchorage-means for enveloping one end of a member to be anchored and including force-transforming formations on the enveloping surface; contractile means having a body-portion interposed between said formations and the members to be anchored and having a head, said body-portion having complementary force-transforming formations on its outer surface; and force-applying means mounted on one end of said anchorage means and abuttable against said head to effectuate contraction of the contractile member.

2. In combination: anchorage means for enveloping one end of a member to be anchored, the enveloping surface thereof having a spiral wedge thereon; movable contractile means interposed between said means and said member, the enveloped surface thereof having a complementary spiral wedge thereon; and means movably mounted around the periphery of one end of said anchorage means and abuttable against said contractile means to set up forces causing contraction of the contractile means.

3. In combination: anchorage means for enveloping one end of a member to be anchored and including force-transforming formations on the enveloping surface; contractile means interposed between said means and said member and including complementary force-transforming formations on its outer surface; a diametrally reduced portion of the outer end of said anchorage means; force-reacting formations on the periphery of said reduced portion; and a member movably mounted on said reduced portion and having complementary force-reacting formations on its inner surface, said member being movable against said contractile means to set up forces causing contraction of said contractile means.

4. In combination: an anchorage member, said member having an interior surface defining a space for receiving one portion of the member to be anchored, said space being adapted to communicate with a corresponding space in the member to be anchored, said interior surface including force-transforming formations thereon; contractile means interposed in said space in the anchorage member, between the anchorage member and the member to be anchored and having complementary formations thereon; and means mounted around the periphery of one end of said anchorage member and abuttable against said contractile means to set up forces for contracting said contractile means.

5. In combination: anchorage means for enveloping one end of a member to be anchored, the enveloping surface having force-transforming formations thereon; a member interposed between said means and said first member and having a sleeve-like inward portion and a abutment on its outer portion and having longitudinally extending slots in its inward portion, the outer surface of said inward-portion having complementary force-transforming formations thereon; and means mounted around the periphery of one end of said anchorage means and movable against said abutment to set up radial forces between said second member and said anchorage means and acting to contract said second member.

6. In combination: an anchorage member for enveloping one end of a member to be anchored, the enveloping surface having force-transforming formations thereon, said anchorage member having the end adjacent the member to be anchored reduced diametrically around its periphery; a contractile member interposed between the anchorage member and the anchored member, said contractile member having complementary force-transforming formations on its outer surface and having an annular flange on its exterior end of a diameter not exceeding that of the anchorage member and defining an annular seat with the unreduced portion of the anchorage member; and a member mounted in said seat for movement against said flange to apply axial force to said formations, said last member having an external diameter not exceeding that of the anchorage member.

7. In combination: an anchorage member for enveloping one end of a member to be anchored, said member having an interior surface defining a space for said end, said surface having a spiral wedge thereon; sleeve means interposed between said members and having an inner portion and an outer portion, the inner portion having longitudinal slots therein and having a spiral wedge on its outer surface complementary to the first spiral wedge, the outer portion constituting an annular flange; the outer end of said anchorage member being diametrally reduced all around its periphery; threads on said reduced portion; and a complementarily-threaded member mounted thereon for movement against said flange to displace the contractile member sufficiently to disalign said complementary spiral wedges and thereby contract said sleeve member.

8. A holding device, including a main member comprising a body having a dead-ended channel leading thereinto; buttress-threads on the interior surface of said channel; a contractile sleeve member in said channel and having complementary buttress threads on its exterior surface and an annular flange on its outer end; a reduced portion of the body of the main member adjacent said flange; and means movably mounted on said reduced portion for applying force to said flange sufficient to reach the threads on said sleeve against those on said channel and contact the contractile member.

9. A holding device, including: a main member having a body and a hollow neck extending therefrom, the body having a conduit extending longitudinally thereof and communicating with said neck; a spiral wedge development on the inner surface of said neck; a contractile sleeve-like member having a complementary spiral wedge development on its outer surface and having an annular flange on its external end; threads on the external periphery of said neck; and a complementarily-threaded member mounted on said first threads and movable on said neck against said flange to thereby "reach" said wedges sufficiently to contract said contractile member.

10. In combination: anchorage-means for enveloping one end of a member to be anchored and including force-transforming formations on the enveloping surface; contractile means having a body-portion interposed between said formations and the member to be anchored, said body-portion having complementary force-transforming formations on its surface; and force-applying means reacting between the anchorage-means and contractile means for effecting contraction of the latter.

JAMES E. FORRY.

REFERENCES CITED

The following references are of record in the file of this patent:

UNITED STATES PATENTS

| Number | Name | Date |
|---|---|---|
| 697,962 | Andersen | Apr. 22, 1902 |

FOREIGN PATENTS

| Number | Country | Date |
|---|---|---|
| 506,646 | Great Britain | May 30, 1939 |

Certificate of Correction

Patent No. 2,434,152. January 6, 1948.

JAMES E. FORRY

It is hereby certified that errors appear in the printed specification of the above numbered patent requiring correction as follows: Column 4, line 34, claim 1, for the word "members" read *member*; column 6, line 16, claim 8, for "contact" read *contract*; and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.*